(12) United States Patent
Zenebe

(10) Patent No.: US 10,425,516 B2
(45) Date of Patent: *Sep. 24, 2019

(54) PROJECTOR HOUSING FOR IPHONE

(71) Applicant: Yonatan Zike Zenebe, Alexandria, VA (US)

(72) Inventor: Yonatan Zike Zenebe, Alexandria, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/159,598

(22) Filed: Oct. 12, 2018

(65) Prior Publication Data

US 2019/0238669 A1    Aug. 1, 2019

Related U.S. Application Data

(63) Continuation of application No. 15/885,789, filed on Jan. 31, 2018, now Pat. No. 10,104,210.

(51) Int. Cl.

| | |
|---|---|
| *H04M 1/02* | (2006.01) |
| *G03B 21/20* | (2006.01) |
| *G03B 21/14* | (2006.01) |
| *H02J 7/35* | (2006.01) |
| *H02S 40/38* | (2014.01) |
| *G03B 21/16* | (2006.01) |
| *H02S 99/00* | (2014.01) |

(52) U.S. Cl.
CPC ........ *H04M 1/0272* (2013.01); *G03B 21/145* (2013.01); *G03B 21/2033* (2013.01); *H02J 7/355* (2013.01); *H02S 40/38* (2014.12); *G03B 21/16* (2013.01); *G03B 21/208* (2013.01); *H02S 99/00* (2013.01); *H04M 2250/54* (2013.01)

(58) Field of Classification Search
None
See application file for complete search history.

(56) References Cited

U.S. PATENT DOCUMENTS

| | | | |
|---|---|---|---|
| 2004/0189951 A1* | 9/2004 | Ogawa | G03B 21/28 353/20 |
| 2006/0267858 A1* | 11/2006 | Yun | G02B 26/0808 345/1.1 |
| 2007/0275752 A1* | 11/2007 | Noba | H04M 1/0214 455/550.1 |
| 2011/0019162 A1* | 1/2011 | Huebner | G03B 21/145 353/79 |
| 2011/0102599 A1* | 5/2011 | Kwon | H04N 5/33 348/164 |
| 2015/0138446 A1* | 5/2015 | Sheng | G03B 21/008 348/766 |

* cited by examiner

*Primary Examiner* — Mohammed Rachedine
(74) *Attorney, Agent, or Firm* — Juneau & Mitchell IP Law Firm; Todd Juneau

(57) ABSTRACT

An iPhone LED projector device that projects a large image from an iPhone onto a nearby wall or screen, where the LED projector is built into a housing for the iPhone, where the iPhone is attached via a lightning connector, where the LED projector device is about the same size as an iPhone and encloses the iPhone in a case, where the LED projector has a removable rechargeable lithium ion battery, an A/C power unit, wherein the LED projector includes external controls on one or more outer surfaces of the housing, wherein the LED projector is able to project an image approximately 100" in size diagonal dimension, and wherein the LED projector includes an audio Bluetooth connection for connecting to an external audio unit.

20 Claims, 12 Drawing Sheets

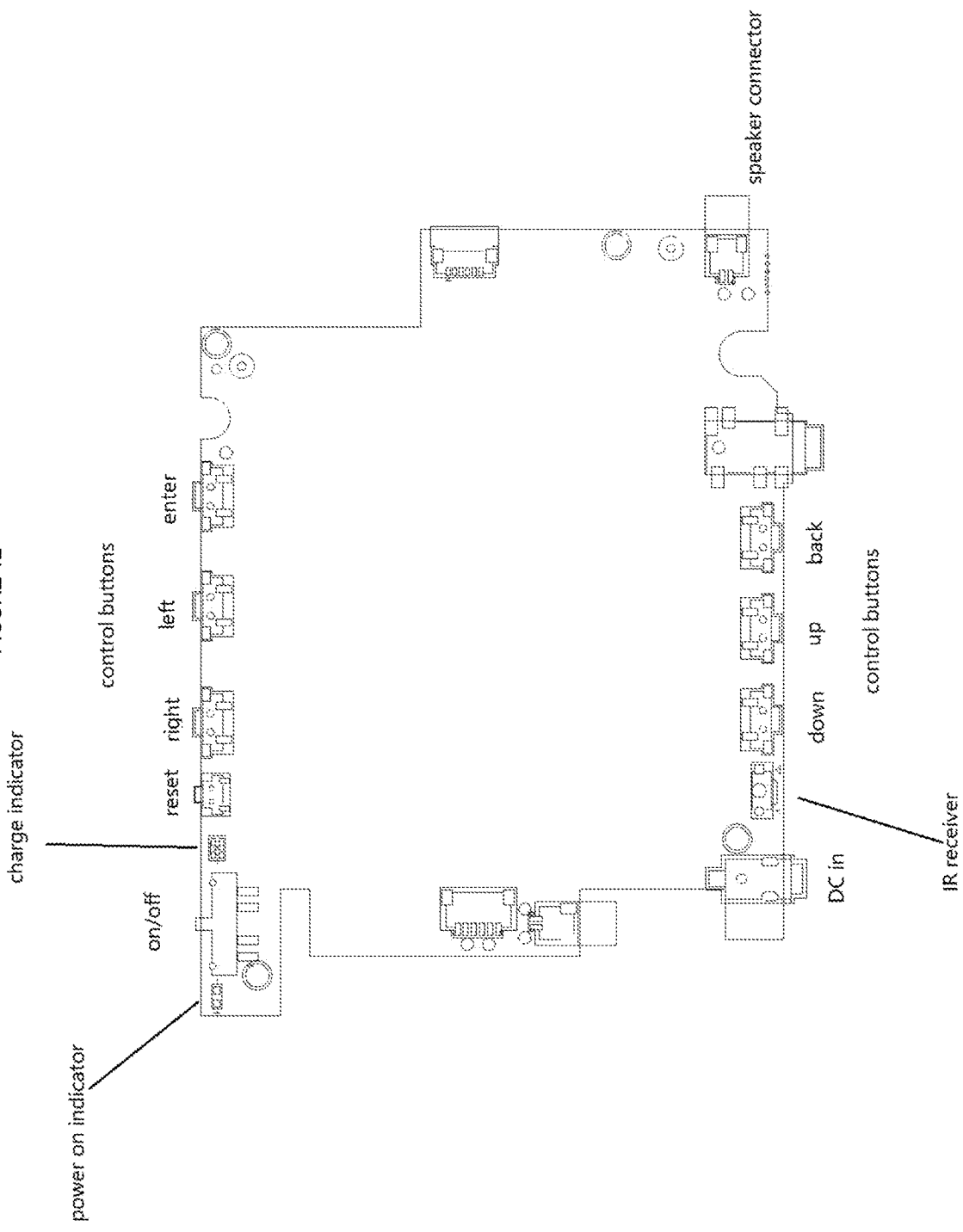

FIGURE 13

| | Tech Specs | Smart Case |
|---|---|---|
| 1 | | |
| 2 | | |
| 3 | Dimensions | see specification |
| 4 | Weight | 100~300g |
| 5 | Resolution | 854x480 |
| 6 | Projector technology | DLP |
| 7 | Brightness | 50 Lumens nominal |
| 8 | Contrast ratio | 800:01:00 |
| 9 | Throw ratio | 1.6 |
| 10 | Image size | up to 70" diangonal |
| 11 | Aspect ratio | 16:09 |
| 12 | Wireless | 2.4GHz wifi |
| 13 | Lamp life rating | 10,000 hours |
| 14 | Keystone correction | na |
| 15 | Physical button control | slide switch power on/off, up/down/left/right/enter/back buttons |
| 16 | Settings options | brightness, multi language, |
| 17 | battery size | 3200mah 3.7V Lithium polymer |
| 18 | Battery life | approx 40minutes on high brightness |
| 19 | External charging | 5.5V DC |
| 20 | Audio output | bluetooth or aux connection if possible can use device that is being projected for audio in devices settings |
| 21 | Display Input | apple AV , USB host for wired iphone/android, airplay, miracast, playback media files in USB flashdrive | ns
PROJECTOR HOUSING FOR IPHONE

CROSS-REFERENCE TO RELATED APPLICATIONS

Provided per USPTO rules by Application Data Sheet.

STATEMENT REGARDING FEDERALLY SPONSORED R&D

Provided per USPTO rules by Application Data Sheet.

NAMES OF PARTIES TO JOINT RESEARCH AGREEMENT

Provided per USPTO rules by Application Data Sheet.

REFERENCE TO SEQUENCE LISTING

Provided per USPTO rules by Application Data Sheet.

STATEMENT RE PRIOR DISCLOSURES

Provided per USPTO rules by Application Data Sheet.

BACKGROUND OF THE INVENTION

Field of the Invention

The invention relates to an LED projector housing for an iPhone.

Prior Art

U.S. Pat. No. 9,405,174 discloses a portable image storage device with integrated projector. However, it does not disclose a housing and is built within the phone itself.

U.S. Pat. No. 8,690,358 discloses a video projection device for mobile device having a first projection surface integral with a surface of the mobile device. However, this refers to hologram projecting system.

U.S. Pat. No. 8,144,188 discloses a projector arrangement. However this is concerned with using two projectors to faciliate 3D projection.

U.S. Pat. No. 7,819,530 discloses an auxiliary device equipped with projector for use with an electronic device, and electronic camera system incorporating the auxiliary device. However, this is not a phone projector, but is a camera projector. Further there is no bluetooth to audio capability.

U.S. Pat. No. 9,277,103 discloses a wireless speaker and digital camera. However, this system plays audio, but captures images, instead of projecting images.

U.S. patent publication number 20080049200 discloses an auxiliary device for electronic device equipped with projector, and electronic camera system. However, this system is not a phone projector, but instead is a camera projector and does not disclose bluetooth to audio capability.

China patent publication CN 2028 1841 7U discloses a multifunctional iPhone companion with a housing cover, projection module, drive circuit boards, high-capacity battery and a speaker. However, it does not provide a bluetooth to audio feature since it has a built in speaker, and does not include a A/C plug-in feature since it provides a large battery.

U.S. patent publication number US 2013 0314677 A1 by 3M company, Rodriquez et al. discloses a projector docking system for handheld electronic devices. However, this device is large cumbersome device that is significantly larger in width, length, and height than a more compact design. The docking system also does not include a bluetooth audio feature.

Additionally, there are some commercial devices that have attempted to provide a device for this market. Some examples are the Pocket Projector for iPhone 4 Devices by Telstar, the Pico projector by General Imaging, and the projector by DAEON, all of which disclose a iPhone projector as a housing/case.

However, there is an unmet need for a compact iPhone projector unit that addresses the shortcomings of the prior art.

SUMMARY

Accordingly, provided herein is an iPhone LED projector device that projects a large image from an iPhone onto a nearby wall or screen, where the LED projector is built into a housing for the iPhone, where the iPhone is attached via a lightning connector, where the LED projector device is about the same size as an iPhone and encloses the iPhone like a case, where the projector has a rechargeable lithium ion battery, also works in A/C power, includes external controls on its outer housing, is able to project an image approximately 100" in size (diagonal dimension), and includes an audio Bluetooth connection for connecting to an external audio unit.

In a preferred embodiment, the inventive subject matter provided herein is a compact projector for a smartphone, comprising:
  (i) a rectangular housing having a front panel, a back panel, a left sidewall, a right sidewall, a top sidewall, and a bottom sidewall;
  (ii) said housing having an overall height from 133 mm to 180 mm, an overall width from 60 mm to 84 mm, and an overall depth of 12 mm to 15 mm;
  (iii) said housing having a rectangular cavity in the front panel, said cavity having a height from 123 mm to 159 mm, a width from 58 mm to 80 mm, and a depth from 6.9 mm to 7.5 mm;
  (iv) said housing cavity defining a front aperture, a back cavity panel, a top cavity sidewall from 58 mm to 80 mm in length, a left cavity sidewall from 123 mm to 159 mm in length, a right cavity sidewall from 123 mm to 159 mm in length, and a bottom cavity sidewall from 58 mm to 80 mm in length;
  (v) an 8-pin configurable, reversible lightning connector extending from the bottom cavity sidewall into the housing cavity, said 8-pin configurable, reversible lightning connector connected to the bottom cavity sidewall by a rotatable hinge, said rotatable hinge having a first position and a second position, said first position pointing outside of the cavity where the smartphone is capable of being connected or disconnected to the 8-pin configurable, reversible lightning connector, said second position pointing within the cavity parallel to the back panel where a smartphone is disposed within the cavity or the 8-pin configurable, reversible lightning connector is folded down for storage;
  (vi) said front panel of said housing having a lower front panel segment having a height from 7 mm to 14 mm, said lower front panel segment having a centrally located indicator light;

(vii) an audio aperture disposed on a left side of said front panel, said audio aperture in communication with a passive audio transmitting cavity disposed within the bottom cavity sidewall;

(viii) said housing having a back panel, said back panel divided into a top section and a bottom section in a 6:4 ratio;

(ix) said top section having a height adjustment device integrated into the back panel, said height adjustment device configured to adjust from 2 mm to 20 mm in height, said height adjustment device comprising a scissor jack having a axial worm screw, said height adjustment device actuated by a manual rotating dial having a geared axle attached to the height adjustment device or by a motorized rotating dial having a geared axle attached to the height adjustment device;

(x) a removable battery housing attached to the top section of the back panel of the housing;

(xi) said removable battery housing having a rechargeable battery pack and configured as an isosceles trapezoidal shape in cross-section and comprised of a large rectangular base panel and a small rectangular bottom panel dimensioned in a 15:7 ratio, said base panel having a height of 79.8 mm to 108 mm and a width of 60 mm to 84 mm, said base panel and said bottom panel connected at a top end and a bottom end by a pair of symmetrical rectangular bevel panels comprising an upper bevel panel and a lower bevel panel, and said base panel and said bottom panel connected along the side by a pair of symmetrical isosceles trapezoidal side panels comprised of a left side bevel panel and a right side bevel panel, said side panels having a depth of said base panel removably connected to the back panel of said housing;

(xii) said rechargeable battery pack having storage of 3200 mAh, and providing 3.7 volts from a lithium polymer battery;

(xiii) said battery housing removably attached along a lower edge of the large rectangular base panel to a lower section of the top section of the back panel, and said battery housing removably attached to the height adjustment device;

(xiv) a camera aperture within the upper bevel panel, said camera aperture having a height from 5 mm to 7 mm and a width of 10 mm to 14 mm, said camera aperture located adjacent the right sidewall;

(xv) a left side control window within the left sidewall of the housing, said left side control window defining an aperture about 7 mm in depth and about 50 mm in height, and said left side control window located adjacent the left cavity sidewall and near the top sidewall;

(xvi) a right side control window within the right sidewall of the housing, said right side control window defining an aperture about 7 mm in depth and about 50 mm to 100 mm in height, said right side control window located adjacent the right cavity sidewall and near the top sidewall;

(xvii) a projector system comprising a projector window with a projection lens and LED illumination source disposed therein within the top sidewall of the housing, said projector window having an overall width of 10 mm to 13 mm and an overall depth of 10 mm to 13 mm, said LED illumination source providing 50 lumens, said projection lens having a projection throw ratio of 1.6 and a projection resolution of 854×480 pixels and an aspect ration of 16:09, said projector system having a single RGB PhlatLight LED chipset and configured to use LED DLP technology;

(xviii) said bottom sidewall of the housing having a USB-C port, an HDMI port, and an audio jack, said USB-C port connected to an internal charging module and configurably connected to an internal processor;

(xix) at least seven (7) physical buttons, each of said at least seven (7) physical buttons disposed in the right side control window or the left side control window, each of said at least seven (7) physical buttons operably connected to the processor and comprising a power on/off button, a up button, a down button, a left button, a right button, an enter button, and a back button, said at least seven (7) physical buttons operably controlling a settings menu configured to display on the smart phone display;

(xx) a communicating module configured to electrically communicate through the lightning connector with an iPhone that is disposed in the cavity;

(xxi) a projection subsystem module configured to project an image that is transmitted through the lightning connector from the iPhone that is disposed in the cavity; and (xxii) an audio bluetooth module for connecting to an external audio speaker unit, said audio bluetooth module.

In another preferred embodiment, the compact projector comprises: (i) a pair of symmetrical rectangular flat solar arrays disposed on the bottom section of said back panel, said pair of symmetrical rectangular flat solar arrays comprised of a left solar array and a right solar array connected in series, said solar arrays defining a central rectangular panel therebetween, wherein each of said solar array is 19 mm to 25 mm in width and 49 mm to 63 mm in height; and (ii) a solar array module configured to receive, manage, and rectify power from solar cells in the solar arrays and transmit power to the rechargeable battery pack in the battery housing.

In another preferred embodiment, the compact projector comprises wherein the solar array is comprised of polycrystalline silicon solar cells.

In another preferred embodiment, the compact projector comprises wherein the solar arrays generate current from 0.100 Amp to 0.500 Amp.

In another preferred embodiment, the compact projector comprises wherein the projector displays an image having a brightness of at least 50 lumens.

In another preferred embodiment, the compact projector comprises wherein the projector displays an image having a brightness from 30 to 70 lumens.

In another preferred embodiment, the compact projector comprises wherein the projector displays an image having a brightness from 30 to 50 lumens.

In another preferred embodiment, the compact projector comprises wherein the projector emits an image having a size from 27 inches to 100 inches diagonal measurement.

In another preferred embodiment, the compact projector comprises wherein the smartphone provides a graphical user interface memory, video processing, and on-screen display for the compact projector.

In another preferred embodiment, the compact projector comprises wherein the projection subsystem modules includes: a light engine that provides a light beam, the light engine including a collection lens, a collimator, and at least one solid state incoherent light emitter that receives an electrical power level and that is coupleable to a heat sink and that provides a light beam with an emitter luminous flux level; an image-forming device that receives image data and that receives at least a component of the light beam, the image-forming device providing an image; and a projection lens assembly that receives the image and that provides an image projection beam having a projected luminous flux level.

In another preferred embodiment, the inventive subject matter comprises a method of projecting an image from a mobile electronic device, comprising the steps:

(1) providing a mobile electronic device in the form of a smart phone capable of displaying a stored or streamed video or image on a built-in touchscreen, where the device has an 8-pin configurable, reversible lightning connector, and electronic hardware and software to provide smartphone/iPhone capabilities;

(2) providing a rectangular housing having a front panel, a back panel, a left sidewall, a right sidewall, a top sidewall, and a bottom sidewall, said housing having an overall height from 133 mm to 180 mm, an overall width from 60 mm to 84 mm, and an overall depth of 12 mm to 15 mm; said housing having a rectangular cavity for containing the device in the front panel, said cavity having a height from 123 mm to 159 mm, a width from 58 mm to 80 mm, and a depth from 6.9m to 7.5 mm; said housing cavity defining a front aperture, a back cavity panel, a top cavity sidewall from 58 mm to 80 mm in length, a left cavity sidewall from 123 mm to 159 mm in length, a right cavity sidewall from 123 mm to 159 mm in length, and a bottom cavity sidewall from 58 mm to 80 mm in length; a lightning connector extending from the bottom cavity sidewall into the housing cavity, said lightning connector connected to the bottom cavity sidewall by a rotatable hinge, said rotatable hinge having a first position and a second position, said first position pointing outside of the cavity where an iPhone is capable of being connected or disconnected to the lightning connector, said second position pointing within the cavity parallel to the back panel where an iPhone is disposed within the cavity or the lightning connector is folded down for storage; said front panel of said housing having a lower front panel segment having a height from 7 mm to 14 mm, said lower front panel segment having a centrally located indicator light and an audio aperture disposed on a left side, said audio aperture in communication with a passive audio transmitting cavity disposed within the bottom cavity sidewall; said housing having a back panel, said back panel divided into a top section and a bottom section in a 6:4 ratio; a camera aperture within the upper bevel panel, said camera aperture having a height from 5 mm to 7 mm and a width of 10 mm to 14 mm, said camera aperture located adjacent the right sidewall; a left side control window within the left sidewall of the housing, said left side control window defining an aperture about 7 mm in depth and about 50 mm in height, and said left side control window located adjacent the left cavity sidewall and near the top sidewall; a right side control window within the right sidewall of the housing, said right side control window defining an aperture about 7 mm in depth and about 50 mm to 100 mm in height, said right side control window located adjacent the right cavity sidewall and near the top sidewall; a projector window with a projection lens disposed therein within the top sidewall of the housing, said projector window having an overall width of 10 mm to 13 mm and an overall depth of 10 mm to 13 mm;

(3) providing a removable battery housing attached to the top section of the back panel of the housing, said removable battery housing having a rechargeable battery pack and configured as an isosceles trapezoidal shape in cross-section and comprised of a large rectangular base panel and a small rectangular bottom panel dimensioned in a 15:7 ratio, said base panel having a height of 79.8 mm to 108 mm and a width of 60 mm to 84 mm, said base panel and said bottom panel connected at a top end and a bottom end by a pair of symmetrical rectangular bevel panels comprising an upper bevel panel and a lower bevel panel, and said base panel and said bottom panel connected along the side by a pair of symmetrical isosceles trapezoidal side panels comprised of a left side bevel panel and a right side bevel panel, said side panels having a depth of said base panel removably connected to the back panel of said housing;

(4) providing a USB-C port, an HDMI port, and a 3.5 mm audio jack located on the bottom sidewall of the housing;

(5) providing a communications module configured to electronically communicate through the lightning connector with an iPhone that is disposed in the cavity; and (6) providing a projection subsystem module configured to project an image that is transmitted through the lightning connector from the iPhone that is disposed in the cavity; and (7) wherein when an image that is stored in or streamed through the device is transmitted through the 8-pin configurable, reversible lightning connector to the communications module for transmission to the projection subsystem for display on an external surface, the video or image is projected on the external surface.

In another preferred embodiment, the inventive subject matter comprises the additional steps:

(i) providing a solar array module configured to receive and rectify power from solar cells in the solar arrays and transmit power to the rechargeable battery pack in the battery housing; and (ii) providing a pair of symmetrical rectangular flat solar arrays disposed on the bottom section of said back panel, said pair of symmetrical rectangular flat solar arrays comprised of a left solar array and a right solar array connected in series, said solar arrays defining a central rectangular panel therebetween, wherein each of said solar array is 19 mm to 25 mm in width and 49 mm to 63 mm in height.

In another preferred embodiment, the inventive subject matter comprises a method wherein the solar array is comprised of polycrystalline silicon solar cells.

In another preferred embodiment, the inventive subject matter comprises a method wherein the solar arrays generate current from 0.100 Amp to 0.500 Amp.

In another preferred embodiment, the inventive subject matter comprises a method wherein the projector emits an image having a brightness of at least 50 lumens.

In another preferred embodiment, the inventive subject matter comprises a method wherein the projector displays an image having a brightness from 30 to 70 lumens.

In another preferred embodiment, the inventive subject matter comprises a method wherein the projector displays an image having a brightness from 30 to 50 lumens.

In another preferred embodiment, the inventive subject matter comprises a method wherein the projector emits an image having a size from 27 inches to 100 inches diagonal measurement.

In another preferred embodiment, the inventive subject matter comprises a method wherein the iPhone provides a graphical user interface memory, video processing, and on-screen display for the projector.

In another preferred embodiment, the inventive subject matter comprises a method wherein the projection subsystem includes: a light engine that provides a light beam, the light engine including a collection lens, a collimator, and at least one solid state incoherent light emitter that receives an electrical power level and that is coupleable to a heat sink and that provides a light beam with an emitter luminous flux level; an image-forming device that receives image data and that receives at least a component of the light beam, the image-forming device providing an image; and a projection lens assembly that receives the image and that provides an image projection beam having a projected luminous flux level.

BRIEF DESCRIPTION OF THE FIGURES

FIG. 12 is a diagram of a PCB board showing details of one embodiment of the electronic.

FIG. 13 is a chart illustrating some of the the technical specifications of one embodiment of the invention.

DETAIL DESCRIPTION OF THE INVENTION

Figure 1:
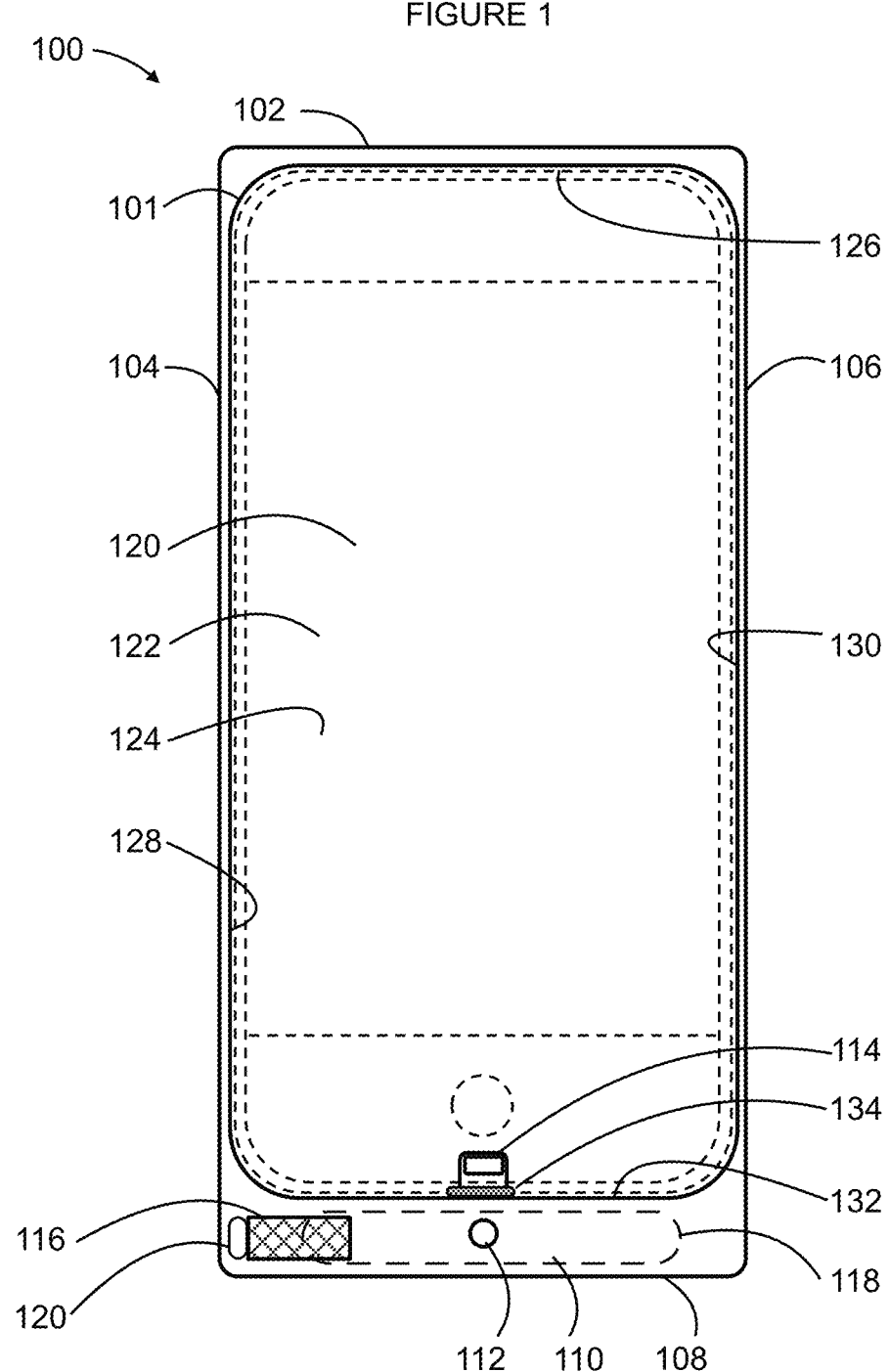
FIG. 1 is an illustration of a front elevation view of one embodiment of the present invention.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Rather, these embodiments are provided so that this disclosure will be thorough and complete, and will fully convey the scope of the invention to those skilled in the art. Like numbers refer to like elements throughout. As used herein the term "and/or" includes any and all combinations of one or more of the associated listed items.

The terminology used herein is for the purpose of describing particular embodiments only and is not intended to limit the full scope of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal subparts. As will be understood by one skilled in the art, a range includes each individual member.

The present application includes various embodiments of a projector configured to cooperate with an Apple iPhone™ handheld electronic device, through the use of compact case having a removable battery, solar recharge feature, and passive audio and active bluetooth audio amplification, providing a portable solution to efficiently and effectively project relatively large, high quality images. In one aspect, the projector may simply be a "pass-through" device including minimal electronics, where most of the electronics would be included in the handheld electronic device connected to the projector. This allows for the user, already familiar with the functionality, the on-screen display, and the graphical user interface of the handheld electronic device, to simply operate the projector. Thus, the projector is simplified to focus on optical performance and, optionally, battery life and acoustic performance as the key attributes of the projector. This beneficially minimizes the cost, complexity, and size of the projector, and eliminates duplication of functions included in the projector and the handheld electronic device.

The present invention is especially directed to an iPhone LED projector device that projects an image from an iPhone where the LED projector is a housing for the iPhone, where the iPhone is attached via a lightning connector, where the LED projector device is about the same size as an iPhone and encloses the iPhone like a case, where the projector has a rechargeable lithium ion battery, also works in A/C power, optionally includes external controls on its outer housing but may also work using the GUI of the smartphone, is able to project an image approximately 100" in size (diagonal dimension), and includes an advanced audio Bluetooth connection for connecting to an external audio unit.

FIGURES

Now referring to the Figures, FIG. 1 illustrates an exemplary embodiment of a front panel 101 of a projector housing 100. The dimension from top front edge 102 to bottom front edge 108 is an overall height from 133 mm to 180 mm. The dimension from left side front edge 104 to right side front edge 106 is an overall width from 60 mm to 84 mm. The top front edge, and the left and right side front edges are configured to be at least 2 mm above the surface of smartphone/iPhone screen face 12 of smartphone 10 to comply with the 120 degree opening requirement for iPhone accessories to maintain touchscreen compatibility. The left side and right side front housing edge 104, 106 are from about 1-2 mm in width. The top front edge 102 is from 3-7 mm in height.

FIG. 1 also shows lower front panel 110 having indicator light 112 and audio speaker window 116. Lower front panel 110 is from 7-14 mm in height and also complies with the 120 degree opening requirement for iPhone accessories to maintain touchscreen compatibility. The 8-pin configurable, reversible lightning connector 114 is shown extending from the inner wall of the cavity into the cavity area. Audio window 116 is in communication with passive audio chamber 118. Passive audio chamber 118 is configured to receive sound coming the smartphone speakers located at the bottom of the smartphone, and re-direct the sound out through the audio window 116. The internal design of the audio cavity 118 acts as a passive amplifier for smartphone sound. Audio window 116 may also be fitted with an active amplifier 120 that receives the input from the audio cavity 118 and electronically amplifies and re-transmits amplified sound through the audio window 116 in parallel with the passive amplification that is already being transmitted. The ability to use passive amplification in conjunction with active amplification reduces battery consumption and maintains a broader audio spectrum due to the excellent audio qualities already present in the smartphone device than is available in lower quality audio speakers commonly found in smartphone case appliances.

FIG. 1 also shows said housing cavity 120 defining a front aperture/opening 122 for inserting the smartphone into the cavity 120. The cavity 120 has a back cavity panel 124, a top cavity sidewall 126 from 58 mm to 80 mm in width, a left cavity sidewall 128 from 123 mm to 159 mm in length, a right cavity sidewall 130 from 123 mm to 159 mm in length, and a bottom cavity sidewall 132 from 58 mm to 80 mm in width.

FIG. 1 also shows an 8-pin configurable reversible lightning connector 114 extending from the bottom cavity sidewall 132 into the housing cavity 120. The lightning connector 114 is connected to the bottom cavity sidewall 132 by a rotatable hinge 134. The rotatable hinge 134 has a first position and a second position, said first position pointing outside of the cavity where a smartphone/an iPhone 10 is capable of being connected or disconnected to the lightning connector 114, said second position pointing within the cavity 120 parallel to the back cavity panel 124 where an iPhone is disposed within the cavity 120 or the lightning connector 114 is folded down for storage.

Figure 2:
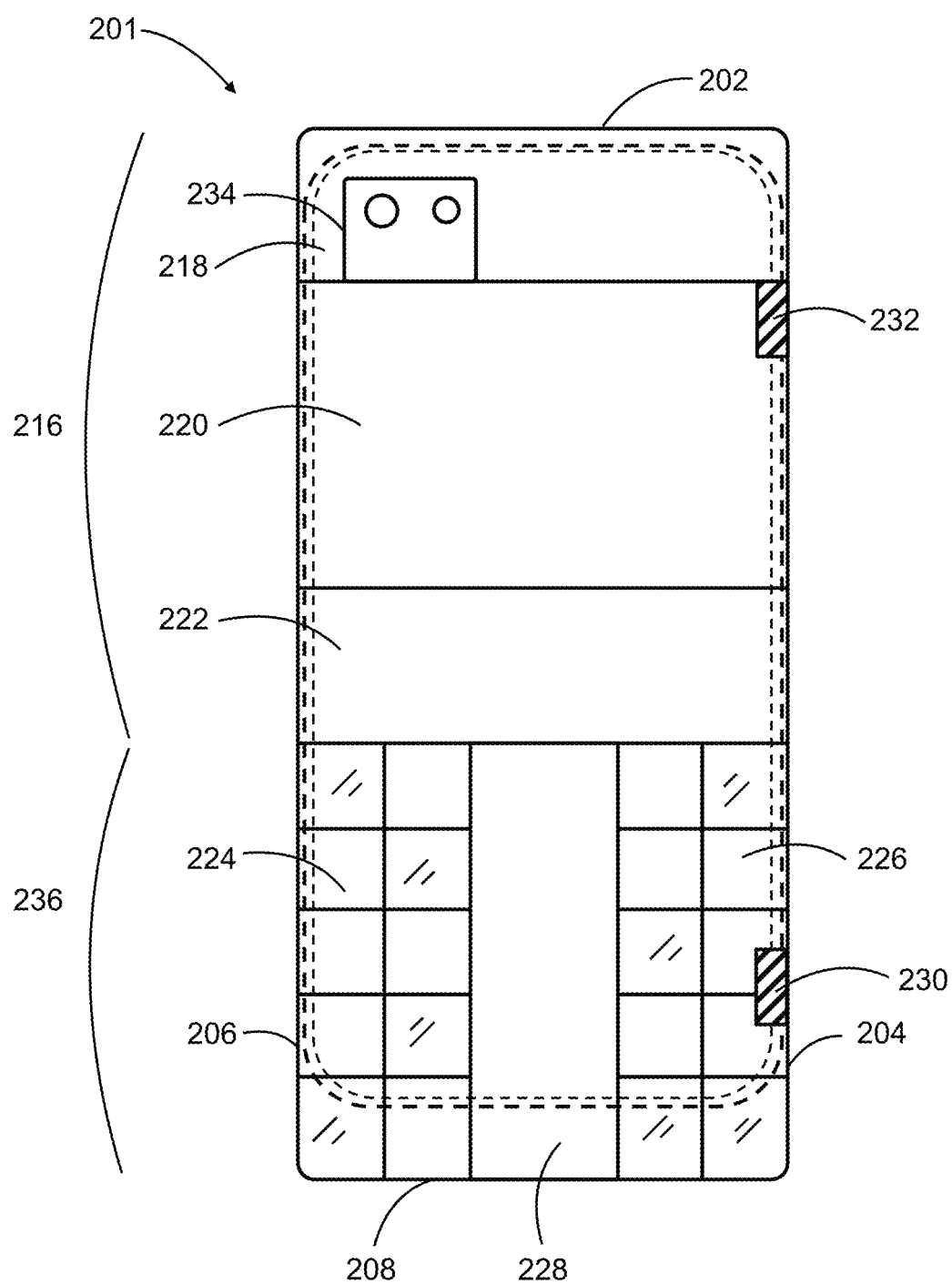
FIG. 2 is an illustration of a back elevation view of one embodiment of the present invention.

FIG. 2 illustrates an exemplary embodiment of a back panel 201 of a projector housing 100. The dimension from back front edge 202 to bottom back edge 208 is an overall height from 133 mm to 180 mm. The dimension from left side back edge 204 to right side back edge 206 is an overall width from 60 mm to 84 mm. Back panel 201 divided into a top section/bevel and battery platform 217 and a bottom section/solar array 236 in a 6:4 ratio.

FIG. 2 shows a camera aperture 234 within the upper bevel panel 218, said camera aperture 234 having a height from 5 mm to 7 mm and a width of 10 mm to 14 mm, and located adjacent the right back edge 206. The top section/bevel and battery platform 217 is a removable battery housing and is attached to the top section 216 of the back panel 201 of the housing. The removable battery housing 217 having a rechargeable battery pack and configured as an isosceles trapezoidal shape in cross-section and comprised of a large rectangular base panel 221 and a small rectangular bottom panel 220 dimensioned in a 15:7 ratio. The base panel 221 is removably connected to the back panel 201 of said housing. The base panel 221 has a height of 79.8 mm to 108 mm and a width of 60 mm to 84 mm, and the base panel 221 and the bottom panel 220 connected at a top end and a bottom end by a pair of symmetrical rectangular bevel panels 218, 222 comprising an upper bevel panel 218 and a lower bevel panel 222. The base panel 221 and the bottom panel 220 connected along the side by a pair of symmetrical isosceles trapezoidal side panels 338, 438 (not shown in FIG. 2) comprised of a left side bevel panel 338 and a right side bevel panel 438 (see FIGS. 3 and 4).

FIG. 2 shows that back panel 201 also provides a pair of symmetrical rectangular flat solar arrays 224, 226 disposed on the bottom section 236 of said back panel 201. The pair of symmetrical rectangular flat solar arrays comprised of a left solar array 224 and a right solar array 226 connected in series. The solar arrays are separated by a smooth panel that defines a central rectangular panel therebetween. Each of the solar arrays is 19 mm to 25 mm in width and 49 mm to 63 mm in height. In a preferred aspect, the solar cells within the solar arrays are comprised of polycrystalline silicon solar cells. In another preferred aspect, the solar arrays generate current from 0.100 Amp to 0.500 Amp.

FIG. 2 also shows optional upper fan vent 232 and lower fan vent 230 to remove excess heat generated by the electronics within the housing.

Figure 3:
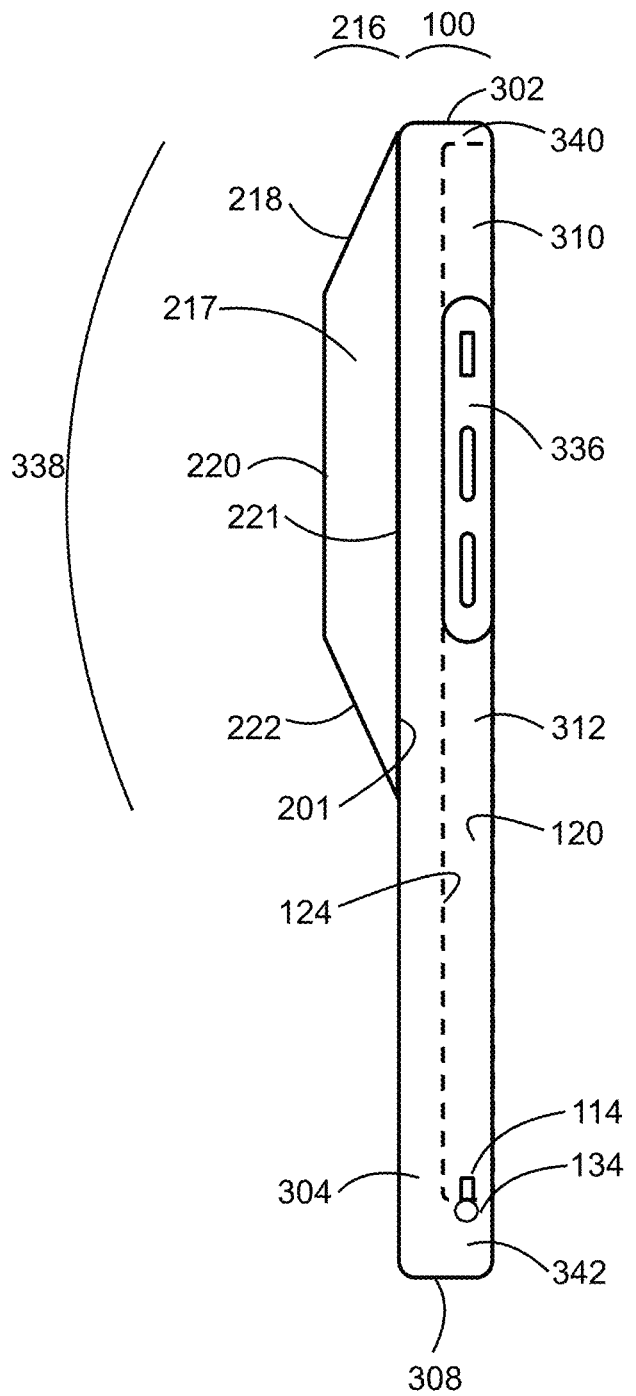
FIG. 3 is an illustration of a left side elevation view of one embodiment of the present invention.

FIG. 3 illustrates an exemplary embodiment of a left side elevation view of the housing 100 with removable battery platform 217. FIG. 3 shows the removable battery housing 217 attached to the top section 216 of the back panel 201 of the housing. The removable battery housing 217 having a rechargeable battery pack and configured as an isosceles trapezoidal shape in cross-section and comprised of a large rectangular base panel 221 and a small rectangular bottom panel 220 dimensioned in a 15:7 ratio. The base panel 221 is removably connected to the back panel 201 of said housing. The base panel 221 has a height of 79.8 mm to 108 mm and a width of 60 mm to 84 mm, and the base panel 221 and the bottom panel 220 connected at a top end and a bottom end by a pair of symmetrical rectangular bevel panels 218, 222 comprising an upper bevel panel 218 and a lower bevel panel 222. The base panel 221 and the bottom panel 220 connected along the side by a pair of symmetrical isosceles trapezoidal side panels, comprised of a left side bevel panel 338 and a right side bevel panel 438 (FIG. 4).

The housing top 302 includes cavity top support member 340 and the housing bottom 308 defines cavity bottom support member 342. Lightning connector 114 is shown with rotatable hinge 134 with first position pointing outside of the cavity where a smartphone/an iPhone is capable of being connected or disconnected to the lightning connector 114, said second position pointing within the cavity 120 parallel to the back cavity panel 124 where an iPhone is disposed within the cavity 120 or the lightning connector 114 is folded down for storage. Left side 304 is approximately 14 mm in width and has a left side control window 336 for accessing smartphone controls, said left side control window flanked by a top top left side support member 310 and a bottom left side support member 312 for enclosing the smartphone when it is placed in the cavity.

Figure 4:
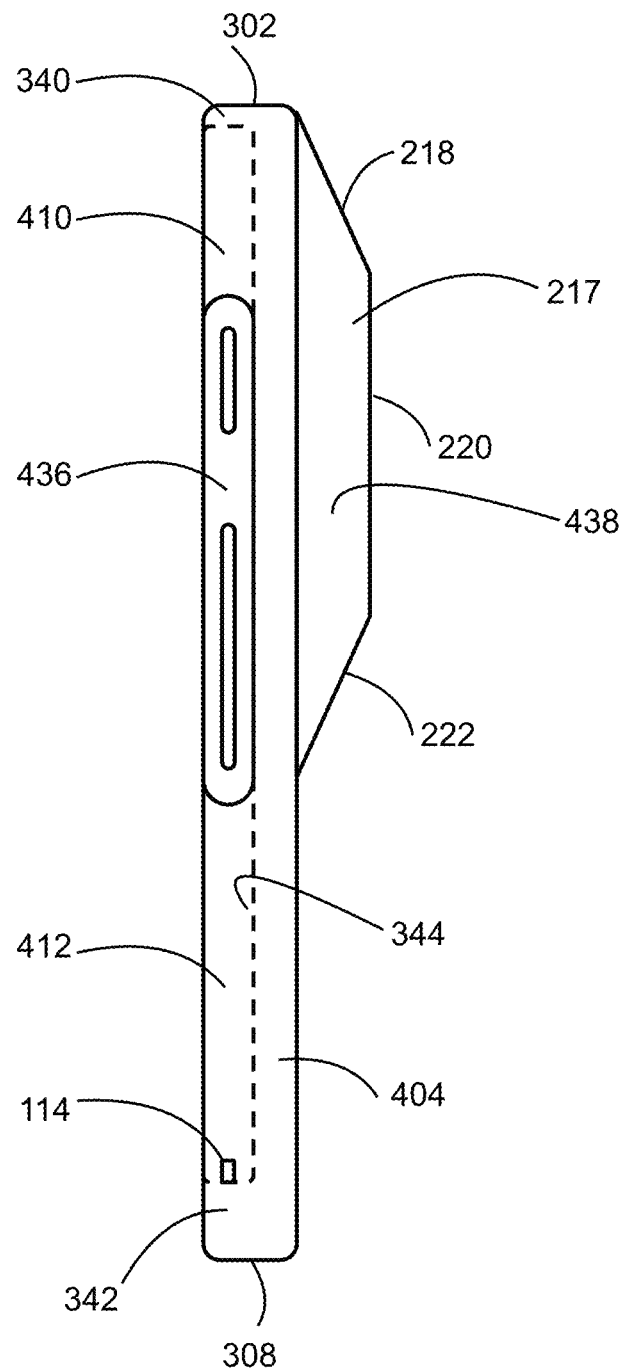
FIG. 4 is an illustration of a right side elevation view of one embodiment of the present invention.

FIG. 4 illustrates an exemplary embodiment of a right side elevation view of the housing 100 with removable battery platform 217. FIG. 4 shows the removable battery housing 217 attached to the top section 216 of the back panel 201 of the housing. As in FIG. 3, FIG. 4 shows the removable battery housing 217 having a rechargeable battery pack and configured as an isosceles trapezoidal shape in cross-section and comprised of a large rectangular base panel 221 and a small rectangular bottom panel 220 dimensioned in a 15:7 ratio. The base panel 221 is removably connected to the back panel 201 of said housing. The base panel 221 has a height of 79.8 mm to 108 mm and a width of 60 mm to 84 mm, and the base panel 221 and the bottom panel 220 connected at a top end and a bottom end by a pair of symmetrical rectangular bevel panels 218, 222 comprising an upper bevel panel 218 and a lower bevel panel 222. The base panel 221 and the bottom panel 220 connected along the side by a pair of symmetrical isosceles trapezoidal side panels, comprised of a right side bevel panel 438 and a left side bevel panel 338 (see FIG. 3).

FIG. 4 also shows the housing top 302 with cavity top support member 340 and housing bottom 308 defining cavity bottom support member 342. Lightning connector 114 is shown with rotatable hinge 134 with first position pointing outside of the cavity where a smartphone/an iPhone is capable of being connected or disconnected to the lightning connector 114, said second position pointing within the cavity parallel to the back cavity panel where an iPhone is disposed within the cavity 120 or the lightning connector 114 is folded down for storage. Right side 404 is approximately 14 mm in width and has a right side control window 436 for accessing smartphone controls, said right side control window flanked by a top right side support member 410 and a bottom right side support member 412 for enclosing the smartphone when it is placed in the cavity.

Figure 5:
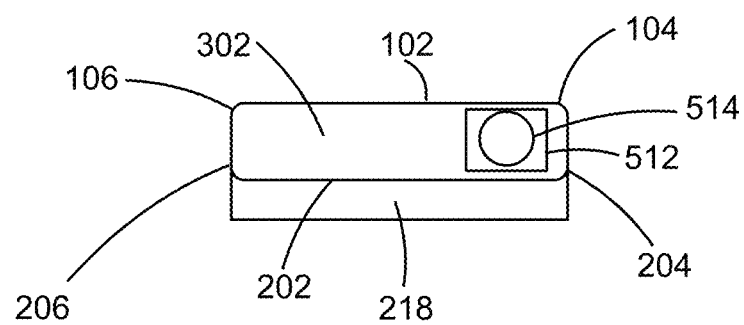
FIG. 5 is an illustration of a top elevation view of one embodiment of the present invention.

FIG. 5 illustrates an exemplary embodiment of a top elevation view of the housing 100. FIG. 5 shows top surface panel 302 having top front edge 102 and top back edge 202. FIG. 5 also shows left side 304 having left front edge 104 and left back edge 204, and shows right side 404 having right front edge 106 and right back edge 206. In this view, FIG. 5 shows top bevel panel 218.

FIG. 5 shows projector window 512 with projector lens 514 disposed therein.

Figure 6:
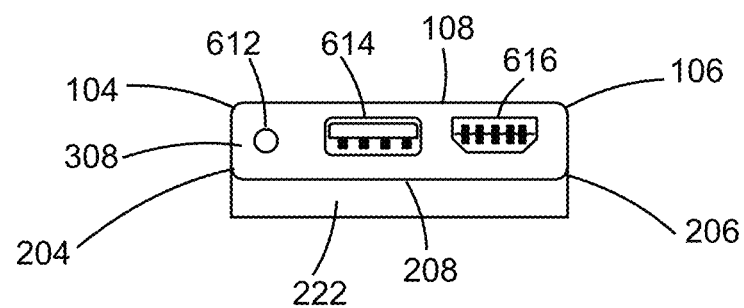
FIG. 6 is an illustration of a bottom elevation view of one embodiment of the present invention.

FIG. 6 illustrates an exemplary embodiment of a bottom elevation view of the housing 100. FIG. 6 shows bottom surface panel 308 having bottom front edge 108 and bottom back edge 208. FIG. 6 also shows left side 304 having left front edge 104 and left back edge 204, and shows right side 404 having right front edge 106 and right back edge 206. In this view, FIG. 5 shows bottom bevel panel 222.

FIG. 6 also shows 3.5 mm audio jack 612, USB port 614, and HDMI port 616.

Figure 7:
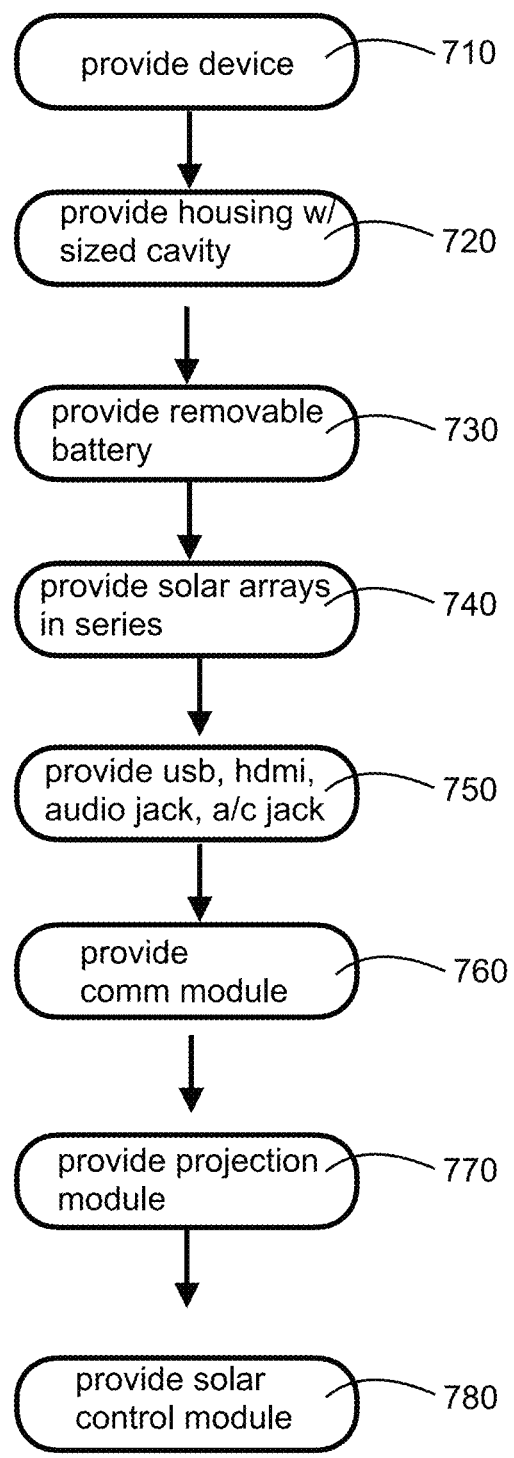
FIG. 7 is a block diagram illustrating exemplary steps according to the present invention.

FIG. 7 illustrates an exemplary embodiment of a series of method steps in accordance with the invention herein. FIG. 7 shows a method of projecting an image from a mobile electronic device, comprising the steps:

(710) providing a mobile electronic device in the form of a smart phone capable of displaying a stored or streamed video or image on a built-in touchscreen, where the device has an 8-pin configurable, reversible lightning connector, and electronic hardware and software to provide smartphone/iPhone capabilities;

(720) providing a rectangular housing having a front panel, a back panel, a left sidewall, a right sidewall, a top sidewall, and a bottom sidewall, said housing having an overall height from 133 mm to 180 mm, an overall width from 60 mm to 84 mm, and an overall depth of 12 mm to 15 mm; said housing having a rectangular cavity for containing the device in the front panel, said cavity having a height from 123 mm to 159 mm, a width from 58 mm to 80 mm, and a depth from 6.9m to 7.5 mm; said housing cavity defining a front aperture, a back cavity panel, a top cavity sidewall from 58 mm to 80 mm in length, a left cavity sidewall from 123 mm to 159 mm in length, a right cavity sidewall from 123 mm to 159 mm in length, and a bottom cavity sidewall from 58 mm to 80 mm in length; a lightning connector extending from the bottom cavity sidewall into the housing cavity, said lightning connector connected to the bottom cavity sidewall by a rotatable hinge, said rotatable hinge having a first position and a second position, said first position pointing outside of the cavity where an iPhone is capable of being connected or disconnected to the lightning connector, said second position pointing within the cavity parallel to the back panel where an iPhone is disposed within the cavity or the lightning connector is folded down for storage; said front panel of said housing having a lower front panel segment having a height from 7 mm to 14 mm, said lower front panel segment having a centrally located indicator light and an audio window disposed on a left side, said audio window in communication with a passive audio transmitting cavity disposed within the bottom cavity sidewall; said housing having a back panel, said back panel divided into a top section and a bottom section in a 6:4 ratio; a camera aperture within the upper bevel panel, said camera aperture having a height from 5 mm to 7 mm and a width of 10 mm to 14 mm, said camera aperture located adjacent the right sidewall; a left side control window within the left sidewall of the housing, said left side control window defining an aperture about 7 mm in depth and about 50 mm in height, and said left side control window located adjacent the left cavity sidewall and near the top sidewall; a right side control window within the right sidewall of the housing, said right side control window defining an aperture about 7 mm in depth and about 50 mm to 100 mm in height, said right side control window located adjacent the right cavity sidewall and near the top sidewall; a projector window with a projection lens disposed therein within the top sidewall of the housing, said projector window having an overall width of 10 mm to 13 mm and an overall depth of 10 mm to 13 mm;

(730) providing a removable battery housing attached to the top section of the back panel of the housing, said removable battery housing having a rechargeable battery pack and configured as an isosceles trapezoidal shape in cross-section and comprised of a large rectangular base panel and a small rectangular bottom panel dimensioned in a 15:7 ratio, said base panel having a height of 79.8 mm to 108 mm and a width of 60 mm to 84 mm, said base panel and said bottom panel connected at a top end and a bottom end by a pair of symmetrical rectangular bevel panels comprising an upper bevel panel and a lower bevel panel, and said base panel and said bottom panel connected along the side by a pair of symmetrical isosceles trapezoidal side panels comprised of a left side bevel panel and a right side bevel panel, said side panels having a depth of said base panel removably connected to the back panel of said housing;

(740) providing a pair of symmetrical rectangular flat solar arrays disposed on the bottom section of said back panel, said pair of symmetrical rectangular flat solar arrays comprised of a left solar array and a right solar array connected in series, said solar arrays defining a central rectangular panel therebetween, wherein each of said solar array is 19 mm to 25 mm in width and 49 mm to 63 mm in height;

(750) providing a USB port, an HDMI port, and a 3.5 mm audio jack located on the bottom sidewall of the housing;

(760) providing a communications module configured to electronically communicate through the lightning connector with an iPhone that is disposed in the cavity;

(770) providing a projection subsystem module configured to project an image that is transmitted through the lightning connector from the iPhone that is disposed in the cavity; and (780) providing a solar array module configured to receive and rectify power from solar cells in the solar arrays and transmit power to the rechargeable battery pack in the battery housing; wherein when an image that is stored in or streamed through the device is transmitted through the 8-pin configurable, reversible lightning connector to the communications module for transmission to the projection subsystem for display on an external surface, the video or image is projected on the external surface.

Figure 8:
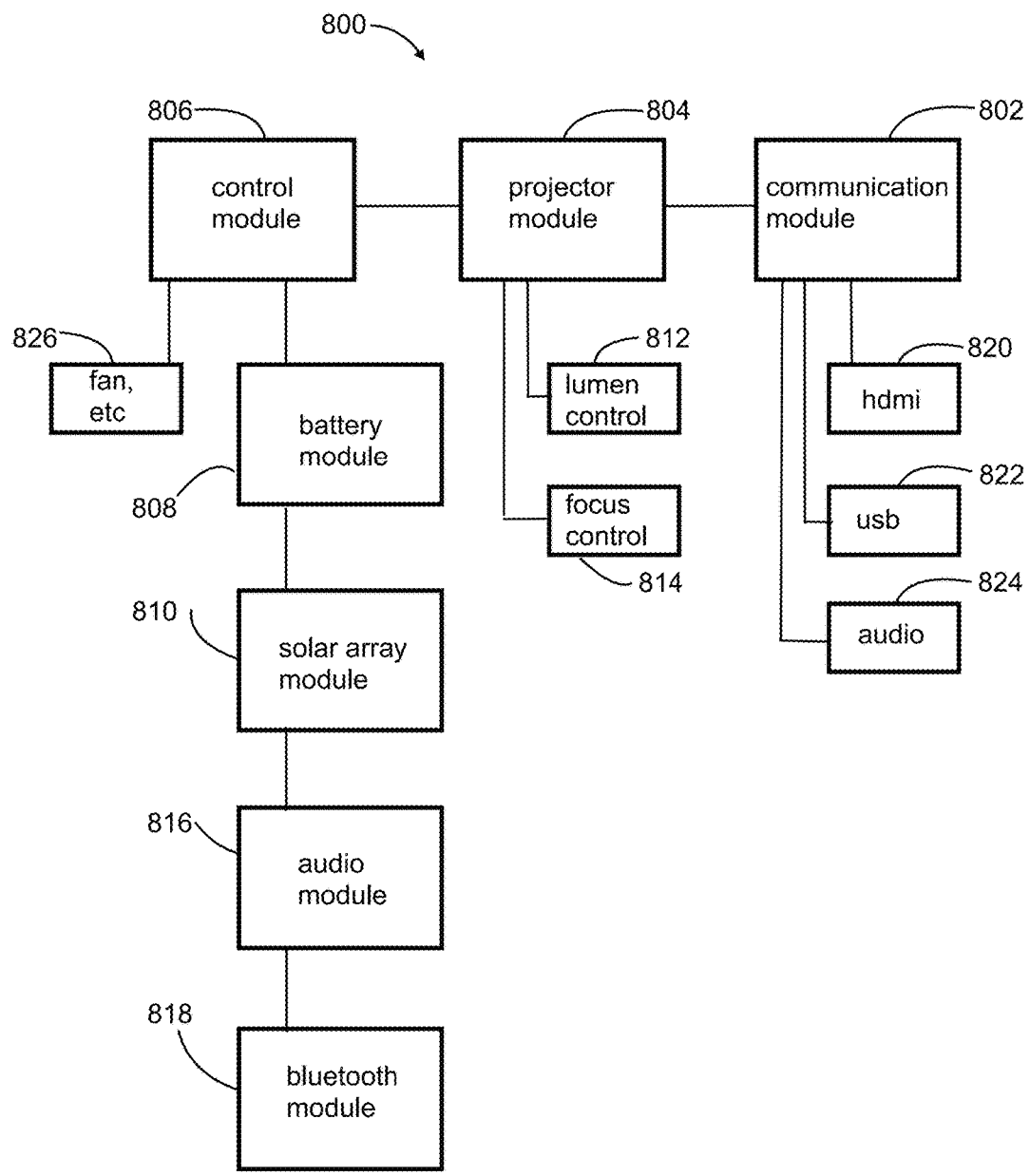
FIG. 8 is a block diagram illustrating electrical components and modules of one embodiment of the present invention.

FIG. 8 illustrates an exemplary embodiment of electronic modules used in the present invention. To simplify the projector housing, certain items including a graphical user interface, memory, video processing, and an on-screen display are provided by the smartphone or handheld electronic device. This beneficially minimizes the cost, complexity, and size of the projector, and eliminates duplication of functions included in the projector and the handheld electronic device. As is known, a graphical user interface of a smartphone allows users to interact with handheld electronic device and projector through images rather than text commands. A graphical user interface represents the information and actions available to a user through graphical icons and visual indicators such as secondary notation (e.g., position, indentation, color, or symmetry), as opposed to text-based interfaces, typed command labels, or text navigation. The actions are usually performed through direct manipulation of the graphical elements. Memory available within a smartphone is configured to store data in support of projector. Video processing capability of the smart phone are used to convert incoming video signals to the native resolution, i.e., the physical resolution determined by a fixed matrix of imaging pixels, of a particular fixed-pixel display. In addition to scaling the image to fit the native resolution, video processing normally enhances the image and remove artifacts caused by the conversion and transmission of video. Video processing can make a significant difference in overall picture quality and has the objective to retain as much of the nuance, detail, and intent of the original source as possible. The smartphone touchscreen is used to display information associated with the projector including a menu with functions and adjustments for handheld electronic device, a menu with functions and adjustments for projector, including functions and adjustments for brightness, contrast, position, zoom, keystone, picture, color, time, language, menu location, and device/projector management such as power, battery, input sources, audio control, and media controls.

FIG. 8 shows electronics system 800 that is comprised of communications modules 802 connected to projector module 804. Projector module 804 includes lumen control module 812 and focus control module 814 so that these items are handled using the GUI of the smartphone. Control module 806 handles routine processing task of the electronics system and connects the projector module 804 to the battery module 808, the solar array module 810, the audio module 816 and the Bluetooth module 818 for connecting to an external audio device. Control module 803 will also control a fan module 826. The communications module 802 is in communication with the HDMI module 820, the USB module 822, and the 3.5 mm audio jack module 824.

In one non-limiting preferred embodiment, the Bluetooth module will be configured to use at least Bluetooth 2.0 and preferably Bluetooth 4.2 to take advantage of the extended packet length (251) of 4.2. By using advanced Bluetooth audio to transmit to an external audio source, this provides an increase in radio efficiency, increase in data rate, and an increase in battery life.

In one non-limiting preferred aspect, the projection subsystem is an LED projector that may comprise a light engine to provide a light beam. The light engine includes a collection lens, a collimator and a solid state light emitter. According to one aspect, the collection lens comprises a hyperhemispheric ball lens. A solid state light emitter receives electrical power with an electrical power level, and thermally couples to a heat sink. A solid state light emitter provides a light beam with a defined luminous flux level. A collimator comprises a focusing unit comprising a first fresnel lens having a first non-faceted side for receiving a first non-collimated beam and a first faceted side for emitting the collimated beam; and a second fresnel lens having a second non faceted side for substantially directly receiving the collimated beam and second faceted side for emitting an output beam.

The projection subsystem may also include a refractive body that receives a polarized beam or uses an internal polarizing filter. A refractive body may include a first external lens surface and a second external lens surfaces having curved lens surfaces. According to another aspect, by combining the polarizing beam splitter and lens functions in a multifunction refractive body, losses that would otherwise occur at air interfaces between separate beam splitters and lenses are avoided. The projection subsystem also comprises an image-forming device that receives image data on electrical input bus. The projection subsystem may also comprise a projection lens assembly that has an F number that is less than 2.4. According to another aspect, the projection subsystem has an ANSI contrast ratio of at least 30:1. According to another aspect, the projection subsystem has an ANSI contrast ratio of at least 50:1. According to another aspect, the projection subsystem has an on/off contrast ratio of at least 100:1.

Figure 9:
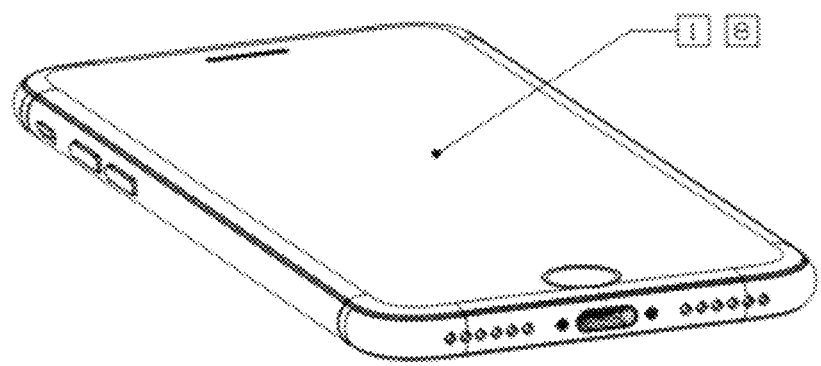
FIG. 9 is an illustration of a front isometric view of one embodiment showing how a smart phone fits into a compact projector of the present invention.
Figure 9:
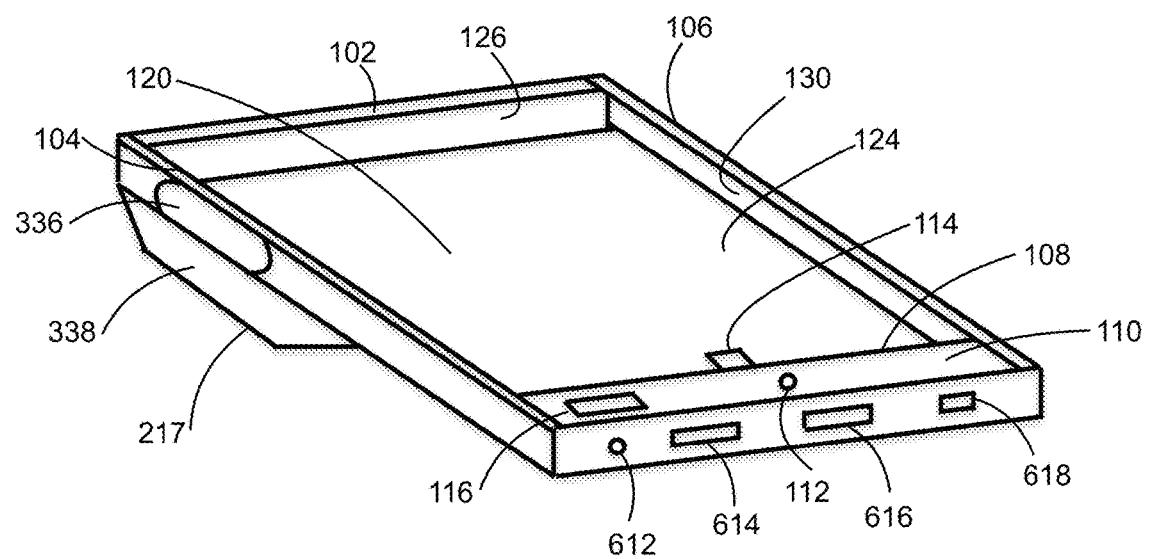

FIG. 9 illustrates an exemplary embodiment of the present invention in a perspective view. FIG. 9 shows a front panel of a projector housing, including top front edge 102, bottom front edge 108, left side front edge 104, and right side front edge 106. FIG. 9 also shows lower front panel 110 having indicator light 112 and audio speaker window 116. The 8-pin configurable, reversible lightning connector 114 is shown in a first position extending from the inner wall of the cavity outside of the cavity area to receive the smartphone in a docking process. Audio window 116 is in communication with passive audio chamber 118, shown as hidden lines. FIG. 9 also shows said housing cavity 120 defining a front aperture/opening for inserting the smartphone into the cavity 120. The cavity 120 has a back cavity panel 124, a top cavity sidewall 126, a left cavity sidewall 128 (not shown), a right cavity sidewall 130, and a bottom cavity sidewall 132 (not shown). The bottom of the housing includes audio jack 612, usb 614, hdmi 616, and a/c power supply port 618. Battery housing 217 is shown in profile as left side 338 located below controls window 336.

Figure 10:
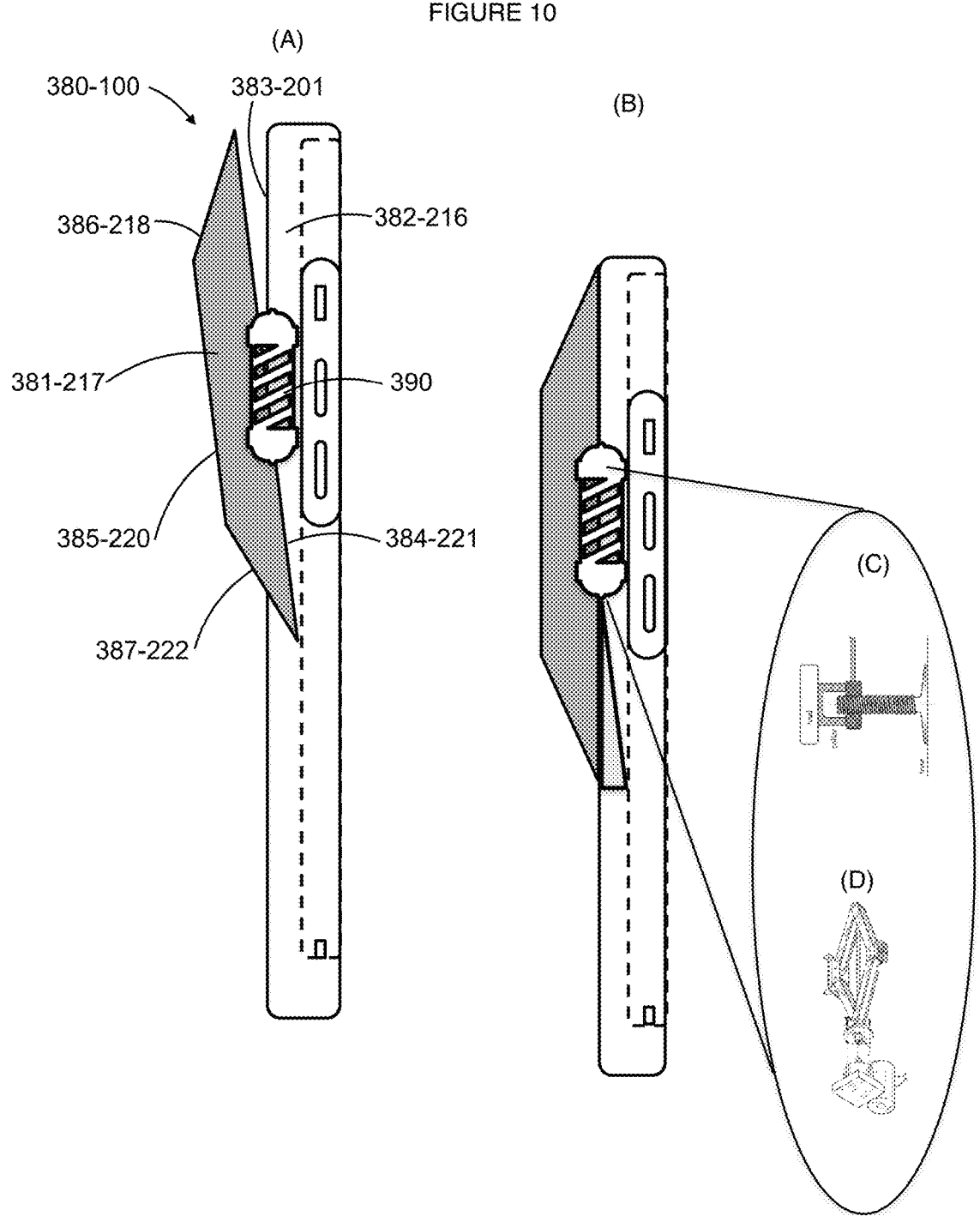
FIG. 10 is a left side illustration of one embodiment of a compact projector and shows a height adjustment mechanism connecting the battery to the back of the case.

FIG. 10 illustrates an exemplary embodiment of a left side elevation view of the housing 380-100 with removable and rotatable battery platform 381-217. FIG. 10 shows the removable battery housing 381-217 attached to the top section 382-216 of the back panel 383-201 of the housing. The removable battery housing 381-217 having a rechargeable battery pack and configured as an isosceles trapezoidal shape in cross-section and comprised of a large rectangular base panel 384-221 and a small rectangular bottom panel 385-220 dimensioned in a 15:7 ratio. The base panel 384-221 is removably connected to the back panel 383-201 of said housing. The base panel 384-221 has a height of 79.8 mm to 108 mm and a width of 60 mm to 84 mm, and the base panel 384-221 and the bottom panel 385-220 connected at a top end and a bottom end by a pair of symmetrical rectangular bevel panels 386-218, 387-222 comprising an upper bevel panel 386-218 and a lower bevel panel 387-222. The base panel 384-221 and the bottom panel 385-220 connected along the side by a pair of symmetrical isosceles trapezoidal side panels, comprised of a left side bevel panel 388-338 and a right side bevel panel 389-438 (not shown).

FIG. 10 shows height adjustment device 390. The height adjustment device 390 functions to raise and lower the projector end of the housing for a user to adjust where a projected image is displayed, e.g. on a wall or screen. In one preferred embodiment, the height adjustment device 390 is a motorized, centrally located mechanism that is electronically controlled by a software module that displays controls in a menu of the GUI of the programming software run by the iPhone for controlling the projection housing. In a preferred embodiment, the mechanism comprises a screw-jack mechanism connected to the housing having a platform connected to the removable and rotatable battery platform 381-217, and either a screw and threaded cylinder on a perpendicular axis to the housing as in FIG. 10(C), or a laterally disposed centimeter-scale scissor jack with screw, collar, and hinged scissor-supports as in FIG. 10(D).

Figure 11:
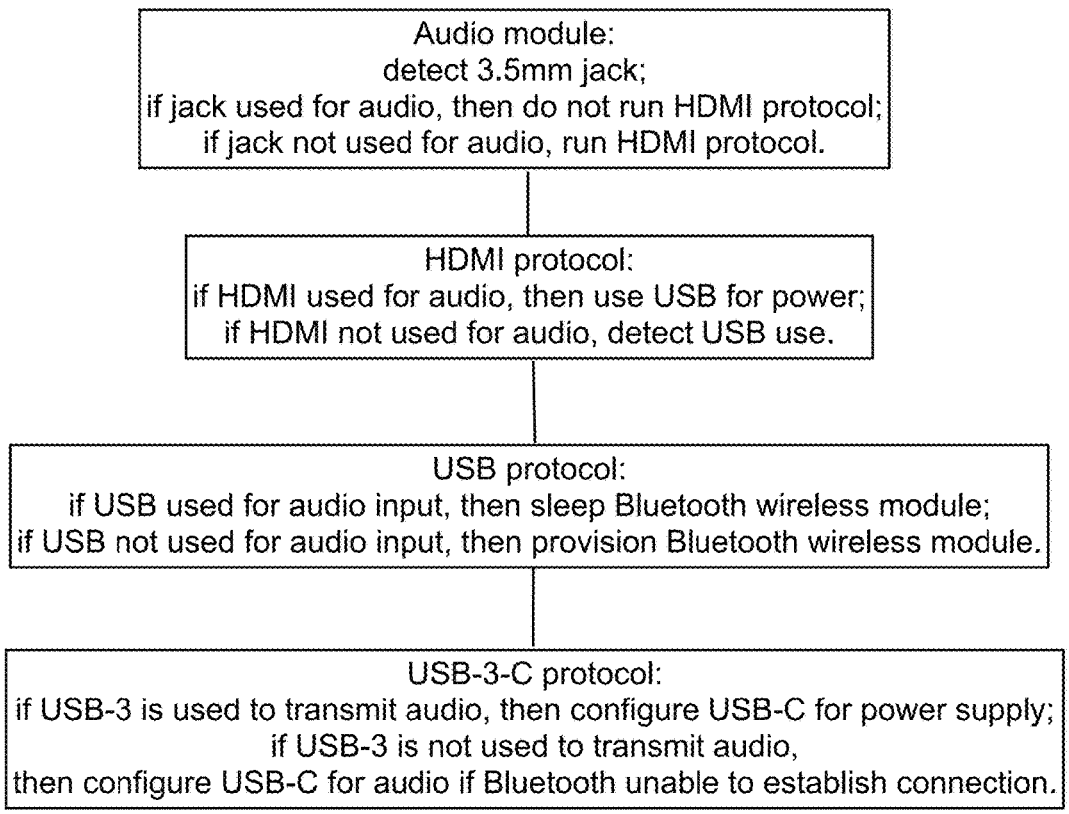
FIG. 11 is a block diagram illustrating electrical logic components and modules for audio, HDMI, USB, and USB-C protocols in one embodiment of the present invention.

FIG. 11 is a logic flowchart and shows an audio detection and provisioning set of protocols. In the Audio module, the module runs a detection process on the 3.5 mm jack; if jack used for audio, then do not run HDMI protocol; if jack not used for audio, run HDMI protocol.

In the HDMI protocol: if HDMI is used for audio, then the protocol configure the USB ports to use USB for power; if HDMI not used for audio, detect USB use.

In the USB protocol: if a USB port is used for audio input, then the Bluetooth wireless module is commanded to sleep for a pre-determined interval, with periodic wake and detect processes; if USB not used for audio input, then the Bluetooth wireless module is provisioned for receiving digital audio data and transmission of audio signals to a paired Bluetooth device.

In the USB-3-C protocol: if the USB-3 port is used to transmit audio, then the USB-C is configured for power supply; if the USB-3 port is not used to transmit audio, then the USB-C is configured for audio if the Bluetooth wireless module was unable to establish connection with its paired device.

In an alternative preferred embodiment, an infrared transceiver unit is deployed within the housing, along with the required control and management modules necessary for implementation and functioning of the hardware similar to the requirements that would be included within the housing for the other ports, i.e. HDMI, 3.5 mm jack, USB-3, USB-C, Lightening connector, and so forth.

In FIG. 12, there is a diagram of a PCB board showing details of one embodiment of the electronics. FIG. 12 shows the layout along the top of the drawing having a power on indicator, on/off toggle, charge indicator, reset button, right, left, and enter buttons. FIG. 12 shows the layout along the bottom of the drawing having DC in, IR receiver, down, up, and back control buttons, and speaker connection.

FIG. 13 is a chart illustrating some of the the technical specifications of one embodiment of the invention. FIG. 13 shows an example of one embodiment having dimensions, weight, resolution, projector technology, brightness, contract ratio, throw ratio, image size, aspect ratio, wireless type, lamp life rating, physical control buttons, setting operations and options, battery size, battery life, external charging, audio output, and display output.

In each of the embodiments and implementations described herein, the various exemplary embodiments of a projector according to an aspect of the present invention and elements thereof are formed of any suitable material. The materials are selected depending upon the intended application and may include both metals and non-metals (e.g., any one or combination of non-conductive materials including but not limited to polymers, glass, and ceramics). and which are formed by methods such as injection molding, extrusion, casting, machining, molding, casting, stamping, machining, and the like. Material selection will depend upon factors including, but not limited to, chemical exposure conditions, environmental exposure conditions including temperature and humidity conditions, flame-retardancy requirements, material strength, and rigidity, to name a few.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

Having described embodiments for the invention herein, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

What is claimed is:
1. A compact projector for a smartphone, comprising:
a rectangular housing having a front panel, a back panel, a left sidewall, a right sidewall, a top sidewall, and a bottom sidewall;
said housing having an overall height from 133 mm to 180 mm, an overall width from 60 mm to 84 mm, and an overall depth of 12 mm to 15 mm;
said housing having a rectangular cavity in the front panel, said cavity having a height from 123 mm to 159 mm, a width from 58 mm to 80 mm, and a depth from 6.9 mm to 7.5 mm;
said housing cavity defining a front aperture, a back cavity panel, a top cavity sidewall from 58 mm to 80 mm in length, a left cavity sidewall from 123 mm to 159 mm in length, a right cavity sidewall from 123 mm to 159 mm in length, and a bottom cavity sidewall from 58 mm to 80 mm in length;
an 8-pin configurable, reversible lightning connector extending from the bottom cavity sidewall into the housing cavity, said 8-pin configurable, reversible lightning connector connected to the bottom cavity sidewall by a rotatable hinge, said rotatable hinge having a first position and a second position, said first position pointing outside of the cavity where the smartphone is capable of being connected or disconnected to the 8-pin configurable, reversible lightning connector, said second position pointing within the cavity parallel to the back panel where a smartphone is disposed within the cavity or the 8-pin configurable, reversible lightning connector is folded down for storage;
said front panel of said housing having a lower front panel segment having a height from 7 mm to 14 mm, said lower front panel segment having a centrally located indicator light;
an audio aperture disposed on a left side of said front panel, said audio aperture in communication with a passive audio transmitting cavity disposed within the bottom cavity sidewall;
said housing having a back panel, said back panel divided into a top section and a bottom section in a 6:4 ratio;
said top section having a height adjustment device integrated into the back panel, said height adjustment device configured to adjust from 2 mm to 20 mm in height;
a removable battery housing attached to the top section of the back panel of the housing;
said removable battery housing having a rechargeable lithium polymer battery pack;
a camera aperture having a height from 5 mm to 7 mm and a width of 10 mm to 14 mm, said camera aperture located adjacent the right sidewall;
a left side control window within the left sidewall of the housing, said left side control window defining an aperture about 7 mm in depth and about 50 mm in height, and said left side control window located adjacent the left cavity sidewall and near the top sidewall;
a right side control window within the right sidewall of the housing, said right side control window defining an aperture about 7 mm in depth and about 50 mm to 100 mm in height, said right side control window located adjacent the right cavity sidewall and near the top sidewall;
a projector system comprising a projector window with a projection lens and LED illumination source disposed therein within the top sidewall of the housing, said projector window having an overall width of 10 mm to 13 mm and an overall depth of 10 mm to 13 mm, said LED illumination source providing at least 50 lumens, said projection lens having a projection throw ratio of at least 1.6 and a projection resolution of at least 854×480 pixels, said projector system having at least one RGB PhlatLight LED chipset and configured to use LED DLP technology;
said bottom sidewall of the housing having a USB-C port, an HDMI port, and an audio jack, said USB-C port connected to an internal charging module and configurably connected to an internal processor;
at least seven (7) physical buttons, each of said at least seven (7) physical buttons disposed in the right side control window or the left side control window, each of said at least seven (7) physical buttons operably connected to the processor and comprising a power on/off button, a up button, a down button, a left button, a right button, an enter button, and a back button, said at least seven (7) physical buttons operably controlling a settings menu configured to display on the smart phone display;
a communicating module configured to electrically communicate through the lightning connector with an iPhone that is disposed in the cavity;
a projection subsystem module configured to project an image that is transmitted through the lightning connector from the iPhone that is disposed in the cavity; and
an audio bluetooth module for connecting to an external audio speaker unit.
2. The compact projector of claim 1, comprising:
(i) a pair of symmetrical rectangular flat solar arrays disposed on the bottom section of said back panel, said pair of symmetrical rectangular flat solar arrays comprised of a left solar array and a right solar array connected in series, said solar arrays defining a central rectangular panel therebetween, wherein each of said solar array is 19 mm to 25 mm in width and 49 mm to 63 mm in height; and

(ii) a solar array module configured to receive, manage, and rectify power from solar cells in the solar arrays and transmit power to the rechargeable battery pack in the battery housing.

3. The compact projector of claim 2, wherein the solar array is comprised of polycrystalline silicon solar cells.

4. The compact projector of claim 2, wherein the solar arrays generate current from 0.100 Amp to 0.500 Amp.

5. The compact projector of claim 2, wherein the projector displays an image having a brightness of at least 50 lumens.

6. The compact projector of claim 2, wherein the projector displays an image having a brightness from 30 to 70 lumens.

7. The compact projector of claim 2, wherein the projector displays an image having a brightness from 30 to 50 lumens.

8. The compact projector of claim 2, wherein the projector emits an image having a size from 27 inches to 100 inches diagonal measurement.

9. The compact projector of claim 2, wherein the smartphone provides a graphical user interface memory, video processing, and on-screen display for the compact projector.

10. The compact projector of claim 2, wherein the projection subsystem modules includes: a light engine that provides a light beam, the light engine including a collection lens, a collimator, and at least one solid state incoherent light emitter that receives an electrical power level and that is coupleable to a heat sink and that provides a light beam with an emitter luminous flux level; an image-forming device that receives image data and that receives at least a component of the light beam, the image-forming device providing an image; and a projection lens assembly that receives the image and that provides an image projection beam having a projected luminous flux level.

11. A method of projecting an image from a mobile electronic device, comprising the steps:
(1) providing a mobile electronic device in the form of a smart phone capable of displaying a stored or streamed video or image on a built-in touchscreen, where the device has an 8-pin configurable, reversible lightning connector, and electronic hardware and software to provide smartphone/iPhone capabilities;
(2) providing a rectangular housing having a front panel, a back panel, a left sidewall, a right sidewall, a top sidewall, and a bottom sidewall, said housing having an overall height from 133 mm to 180 mm, an overall width from 60 mm to 84 mm, and an overall depth of 12 mm to 15 mm; said housing having a rectangular cavity for containing the device in the front panel, said cavity having a height from 123 mm to 159 mm, a width from 58 mm to 80 mm, and a depth from 6.9m to 7.5 mm; said housing cavity defining a front aperture, a back cavity panel, a top cavity sidewall from 58 mm to 80 mm in length, a left cavity sidewall from 123 mm to 159 mm in length, a right cavity sidewall from 123 mm to 159 mm in length, and a bottom cavity sidewall from 58 mm to 80 mm in length; a lightning connector extending from the bottom cavity sidewall into the housing cavity, said lightning connector connected to the bottom cavity sidewall by a rotatable hinge, said rotatable hinge having a first position and a second position, said first position pointing outside of the cavity where an iPhone is capable of being connected or disconnected to the lightning connector, said second position pointing within the cavity parallel to the back panel where an iPhone is disposed within the cavity or the lightning connector is folded down for storage; said front panel of said housing having a lower front panel segment having a height from 7 mm to 14 mm, said lower front panel segment having a centrally located indicator light and an audio aperture disposed on a left side, said audio aperture in communication with a passive audio transmitting cavity disposed within the bottom cavity sidewall; said housing having a back panel, said back panel divided into a top section and a bottom section in a 6:4 ratio; a camera aperture located adjacent the right sidewall; a left side control window within the left sidewall of the housing, said left side control window defining an aperture about 7 mm in depth and about 50 mm in height, and said left side control window located adjacent the left cavity sidewall and near the top sidewall; a right side control window within the right sidewall of the housing, said right side control window defining an aperture about 7 mm in depth and about 50 mm to 100 mm in height, said right side control window located adjacent the right cavity sidewall and near the top sidewall; a projector window with a projection lens disposed therein within the top sidewall of the housing, said projector window having an overall width of 10 mm to 13 mm and an overall depth of 10 mm to 13 mm;
(3) providing a removable battery housing attached to the top section of the back panel of the housing, said removable battery housing having a rechargeable lithium polymer battery pack;
(4) providing a USB-C port, an HDMI port, and a 3.5 mm audio jack located on the bottom sidewall of the housing;
(5) providing a communications module configured to electronically communicate through the lightning connector with an iPhone that is disposed in the cavity; and
(6) providing a projection subsystem module configured to project an image that is transmitted through the lightning connector from the iPhone that is disposed in the cavity; and
(7) wherein when an image that is stored in or streamed through the device is transmitted through the 8-pin configurable, reversible lightning connector to the communications module for transmission to the projection subsystem for display on an external surface, the video or image is projected on the external surface.

12. The method of claim 11, comprising the steps:
(i) providing a solar array module configured to receive and rectify power from solar cells in the solar arrays and transmit power to the rechargeable battery pack in the battery housing; and
(ii) providing a pair of symmetrical rectangular flat solar arrays disposed on the bottom section of said back panel, said pair of symmetrical rectangular flat solar arrays comprised of a left solar array and a right solar array connected in series, said solar arrays defining a central rectangular panel therebetween, wherein each of said polar array is 19 mm to 25 mm in width and 49 mm to 63 mm in height.

13. The method of claim 11, wherein the solar array is comprised of polycrystalline silicon solar cells.

14. The method of claim 11, wherein the solar arrays generate current from 0.100 Amp to 0.500 Amp.

15. The method of claim 11, wherein the projector emits an image having a brightness of at least 50 lumens.

16. The method of claim 11, wherein the projector displays an image having a brightness from 30 to 70 lumens.

17. The method of claim 11, wherein the projector displays an image having a brightness from 30 to 50 lumens.

18. The method of claim 11, wherein the projector emits an image having a size from 27 inches to 100 inches diagonal measurement.

19. The method of claim 11, wherein the iPhone provides a graphical user interface memory, video processing, and on-screen display for the projector.

20. The method of claim 11, wherein the projection subsystem includes: a light engine that provides a light beam, the light engine including a collection lens, a collimator, and at least one solid state incoherent light emitter that receives an electrical power level and that is coupleable to a heat sink and that provides a light beam with an emitter luminous flux level; an image-forming device that receives image data and that receives at least a component of the light beam, the image-forming device providing an image; and a projection lens assembly that receives the image and that provides an image projection beam having a projected luminous flux level.

* * * * *